(12) United States Patent
Wu

(10) Patent No.: US 12,095,107 B1
(45) Date of Patent: Sep. 17, 2024

(54) INFLATABLE EQUIPMENT WITH A STARTING POWER SUPPLY

(71) Applicant: Shenzhen Jieqi Technology Innovation Co., Ltd., Shenzhen Guangdong (CN)

(72) Inventor: Zhipeng Wu, Shenzhen Guangdong (CN)

( * ) Notice: Subject to any disclaimer, the term of this patent is extended or adjusted under 35 U.S.C. 154(b) by 0 days.

(21) Appl. No.: 18/644,146

(22) Filed: Apr. 24, 2024

(51) Int. Cl.
 *H01M 50/247* (2021.01)
(52) U.S. Cl.
 CPC ...... *H01M 50/247* (2021.01); *H01M 2220/20* (2013.01)
(58) Field of Classification Search
 CPC . H01M 50/247; H01M 2220/20; B60C 23/00; F04D 25/0673; F16K 15/20
 See application file for complete search history.

(56) References Cited

U.S. PATENT DOCUMENTS

| 2020/0011311 A1* | 1/2020 | Komiya | F04B 39/121 |
| 2023/0208135 A1* | 6/2023 | Hacker Davidson | F04D 27/0207 320/137 |

FOREIGN PATENT DOCUMENTS

EM  015052176-0001  2/2024

OTHER PUBLICATIONS

The above application 015052176-0001 was filed by the inventor in Europe (EU) on Feb. 29, 2024.

* cited by examiner

*Primary Examiner* — P. Macade Nichols

(57) ABSTRACT

An inflatable equipment with a starting power supply is disclosed, which belongs to the technical field of inflatable equipments. The inflatable equipment with a starting power supply includes a housing; a battery pack, fixedly provided in the housing, and the housing is fixedly provided with a connection interface electrically connected to the battery pack; and an inflator pump module, fixedly provided in the housing. Herein the inflator pump module is electrically connected to the battery pack, the housing is opened with an air inlet, an input end of the inflator pump module is connected to the air inlet, the housing is fixedly provided with an inflatable interface, and the inflatable interface is connected to an output end of the inflator pump module. The inflatable equipment has a compact and small structure, which is easy to be stored and carried, thereby improving user's experience.

8 Claims, 5 Drawing Sheets

INFLATABLE EQUIPMENT WITH A STARTING POWER SUPPLY

TECHNICAL FIELD

The present application relates to the technical field of inflatable equipments, and in particular to an inflatable equipment with a starting power supply.

BACKGROUND

Emergency starting power supply usually refers to vehicle emergency starting power supply, a main body of which is a battery pack, whose most basic function is to store electrical energy. In a case of freezing or failure of the battery pack for vehicles, it does not require any alternating current power supply to be used as a starting system with a voltage of 12 volts to start the vehicles. Currently, automobiles and trucks require 12 volts from their own battery pack to start an engine. When the battery pack is inoperable, the automobiles won't start, so the emergency starting power supply may be used as to start the automobiles instead of the automobile's own battery pack. Electric inflator pumps usually provide power by plugging into an electrical plug or using a built-in battery to inflate automobile's tires, bicycle tires, inflatable mattresses, swimming rings, and other items.

At present, a vehicle starting power supply and an inflator pump are regular items for the automobiles, however the vehicle starting power supply and the inflator pump are designed separately, which leads to its occupying a large space, is inconvenient to store, and is not convenient enough to use. Therefore, it does not meet consumer's requirements for use.

SUMMARY

The present disclosure aims to provide an inflatable equipment with a starting power supply to address problems of in existing technologies that a starting power supply and an inflatable pump take up a lot of space, are inconvenient to be stored, and also are not convenient enough to be used.

To achieve above objectives, the present disclosure adopts following technical solutions. In some embodiments of the present disclosure, an inflatable equipment with a starting power supply is provided, including a housing; a battery pack, fixedly provided in the housing, and the housing is fixedly provided with a connection interface and the connection interface is electrically connected to the battery pack; and an inflator pump module, fixedly provided in the housing. Herein the inflator pump module is electrically connected to the battery pack, the housing is opened with an air inlet, an input end of the inflator pump module is connected to the air inlet, the housing is fixedly provided with an inflatable interface, and the inflatable interface is connected to an output end of the inflator pump module.

To reduce items such as dust to entering into the inflatable interface, preferably, the housing is opened with a connecting channel, the inflatable interface is arranged in the connecting channel, the connecting channel is provided with a protective plate inside, the protective plate is fixedly provided with a rotation shaft, the rotation shaft is rotationally connected to the connecting channel, and the rotation shaft is sleeved with a torsional spring.

To facilitate air supply for the inflatable interface, preferably, inflator pump module is fixedly provided with a first pipe, the inflatable interface is connected to the first pipe through a branch pipe, and the first pipe is provided with a valve.

To reduce air wastage, preferably, the inflatable interface is slidably provided with a baffle inside and an inner wall of the inflatable interface is opened with a vent hole connected with the branch pipe, the baffle has an outer wall against an outlet end face of the vent hole, the inflatable interface is provided with a spring inside, and both ends of the spring are against the baffle and the inflatable interface respectively.

Preferably, the baffle is fixedly provided with a sealing ring and the sealing ring is symmetrically provided in two sets, and an outlet of the vent hole is located between the two sets of sealing rings.

Preferably, an outer wall of the air inlet is fixedly provided with a dustproof net, an inner wall of the housing is slidably provided with a mounting bracket and the mounting bracket is fixedly provided with a nozzle, the inflator pump module is fixedly provided with a second pipe with the valve and the second pipe is rotatably provided with an adapter, and the adapter is connected with the nozzle by means of an elastic pipe.

Preferably, an outer wall of the housing is slidably provided with a drive rod, the mounting bracket is fixedly provided with a first magnetic block, and the drive rod is fixedly provided with a second magnetic block magnetically suctioned with the first magnetic block.

Preferably, the housing is opened with several sets of heat dissipation holes.

Compared with the existing technologies, the inflatable equipment with a starting power supply of the present disclosure has at least following beneficial effects and advantages.

1. The inflatable equipment with a starting power supply of the present disclosure, by fixedly setting the battery pack and the inflator pump module in the housing, which can be made to have both inflating and electrifying functions to improve ranges of application. And the inflatable equipment has a compact and small structure, which is easy to be stored and carried, thereby improving user's experience.

2. The inflatable equipment with a starting power supply of the present disclosure, by slidably setting the mounting bracket in the housing and fixedly setting the nozzle on the mounting bracket, it is possible to blowback of the dustproof net on the outer wall of the air inlet to reduce the dust on the dustproof net, thereby improving the effectiveness of use.

Parts not involved in the inflatable equipment with a starting power supply of the present disclosure are the same as the existing technologies, or can be realized by using the existing technologies. The inflatable equipment with a starting power supply of the present disclosure, by fixedly setting the battery pack and the inflator pump module in the housing, which can be made to have both inflating and electrifying functions to improve the ranges of application. And the inflatable equipment has a compact and small structure, which is easy to be stored and carried, thereby improving user's experience.

Figure 1:
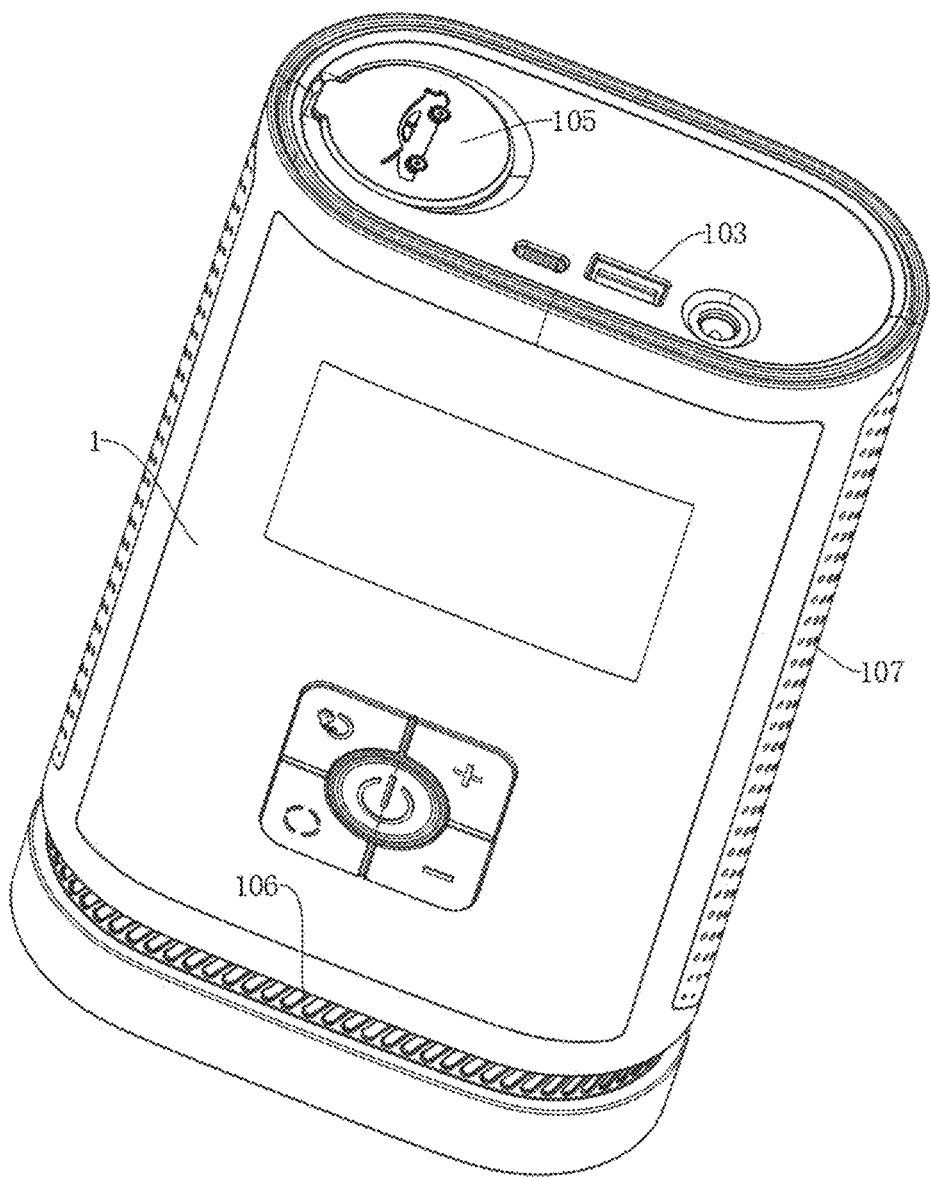
FIG. 1 shows a structural schematic diagram of an inflatable equipment with a starting power supply in accordance with some embodiments of the present disclosure.

In the drawings, reference signs are as follows. 1. Housing, 101. Battery pack, 102. Inflator pump module, 103. Connection interface, 104. Inflatable interface, 105. Protective plate, 106. Air inlet, 107. Heat dissipation hole, 108. First pipe, 109. Second pipe, 110. Brach pipe, 2. Mounting bracket, 201. Nozzle, 202. First magnetic block, 3. Adapter, 301. Elastic pipe, 4. Drive rod, 401. Second magnetic block, 5. Baffle, 501. Spring, 502. Sealing ring, 503. Vent hole.

DETAILED DESCRIPTION OF THE EMBODIMENTS

The technical solutions in embodiments of the present disclosure will be clearly and completely described below in conjunction with accompanying drawings in the embodiments of the present disclosure. Obviously, described embodiments are only a part of the embodiments of the present disclosure and not all of the embodiments of the present disclosure.

In the description of the present disclosure, it should be understood that terms "up", "down", "front", "back", "left", "right", "top", "bottom", "inside", "outside", and the like indicating orientation or positional relationships are based on those shown in the accompanying drawings, and are intended only for the purpose of facilitating the description of the present disclosure and simplifying the description, and are not intended to indicate or imply that a device or an element referred to must have a particular orientation, be constructed and operated in a particular orientation, and therefore is not to be construed as a limitation of the present invention.

EMBODIMENTS

Referring to FIG. 1 to FIG. 5, in some embodiments of the present disclosure, an inflatable equipment with a starting power supply is provided, including a housing 1, the housing 1 is made of plastic or metal, such as aluminum alloy, herein preferably plastic. The housing 1 is fixedly provided with a control panel and a display screen for controlling a startup of an inflator pump module 102, and also for displaying information such as power level of a battery pack 101 and an air pressure of a tire. Moreover, the inflatable equipment with a starting power supply further includes the battery pack 101 fixedly provided in the housing 1, the battery pack 101 may be a rechargeable. The housing 1 is fixedly provided with a connection interface 103, and the connection interface 103 includes a charging interface and a lapping interface, each can be used for charging the battery pack 101 and lapping power supply to a vehicle, thereby improving effectiveness of use. The connection interface 103 is electrically connected to the battery pack 101. In addition, the inflatable equipment with a starting power supply further includes an inflator pump module 102 fixedly provided in the housing 1. Herein the inflator pump module 102 is electrically connected to the battery pack 101, to facilitate the battery pack 101 to provide power supply for the inflator pump module 102. The housing 1 is opened with an air inlet 106, an input end of the inflator pump module 102 is connected to the air inlet 106. The housing 1 is fixedly provided with an inflatable interface 104, and the inflatable interface 104 is connected to an output end of the inflator pump module 102. When in use, in case of the tire pressure is insufficient, two ends of an inflatable tube are connected to the inflatable interface 104 and a tire inflatable interface respectively, and then the inflator pump module 102 is activated to extract air from the outside through the air inlet 106 and transmit it to vehicle's tires through the inflatable interface 104, which facilitates air intake and inflation for the tires. When it is necessary to lap power for the vehicle, one end of a connection cable is connected to the battery pack of vehicle, and the other end of the connection cable is connected to an lap interface within the connection interface 103, and then the battery pack 101 is started to start the vehicle, which is easy to use.

Moreover, the inflatable equipment with a starting power supply of the present disclosure has a compact and small structure, which is easy to be stored and carried, thereby improving user's experience.

When in use, by fixedly setting the battery pack 101 and the inflator pump module 102 in the housing 1, it can be made to have both inflating and powering effects, thereby improving ranges of application. Moreover, it has a compact and small structure, which is easy to be stored and carried, thereby improving user's experience. By slidingly setting a mounting bracket 2 in the housing 1 and fixedly setting a nozzle 201 on the mounting bracket 2, it is possible to backblow the dustproof net on the outer wall of the air inlet 106, thereby reducing the dust on the dustproof net and improving the effectiveness of use.

Figure 2:
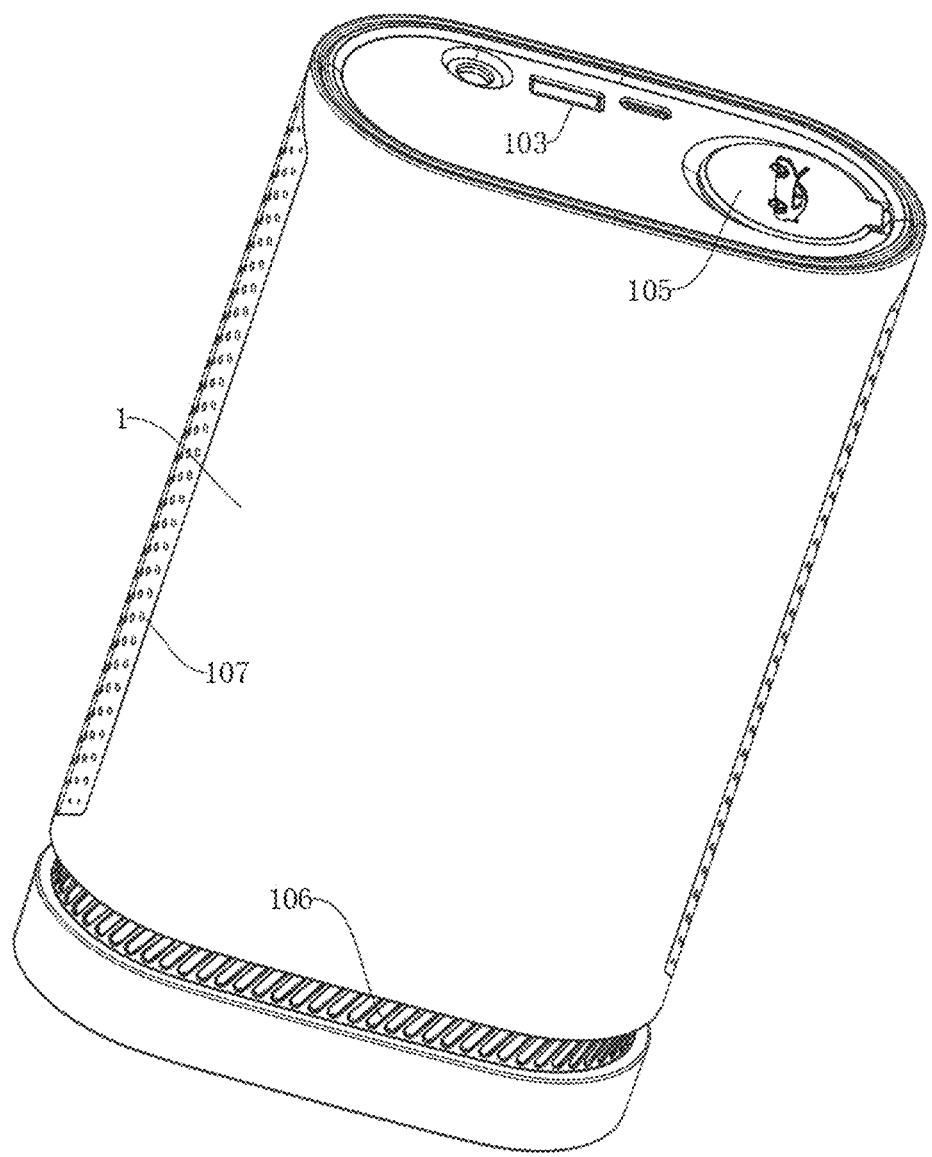
FIG. 2 shows another structural schematic diagram of the inflatable equipment with a starting power supply in accordance with some embodiments of the present disclosure.
Figure 3:
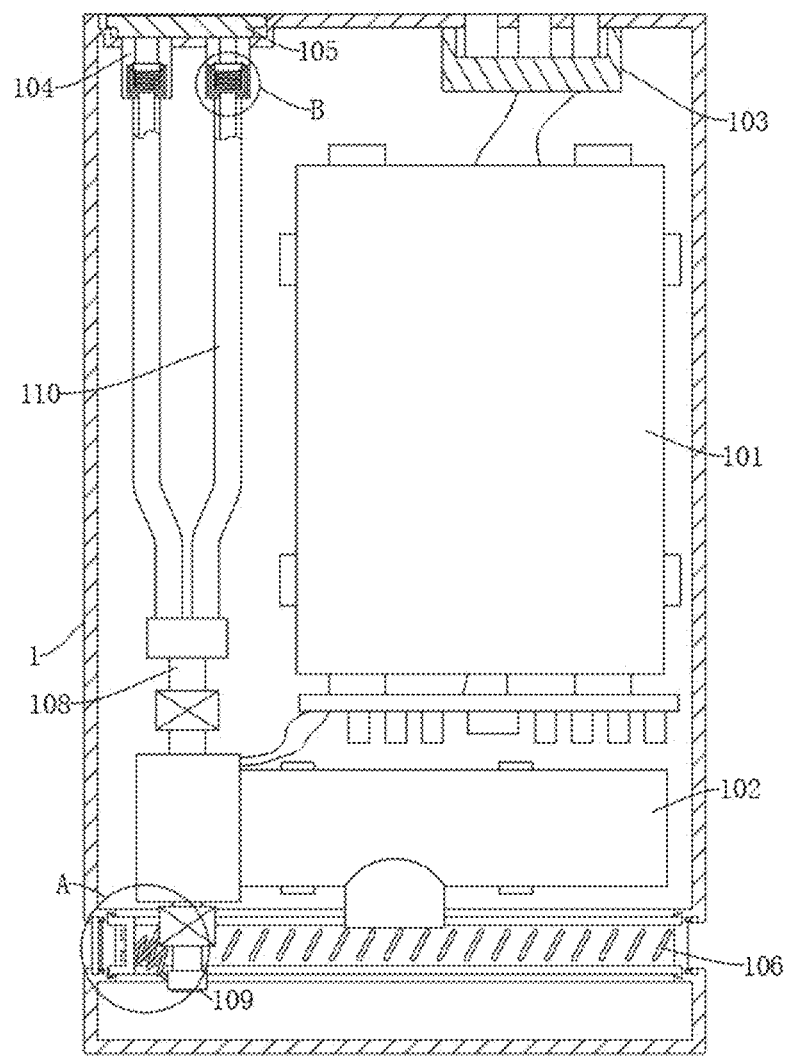
FIG. 3 shows a section view of the inflatable equipment with a starting power supply in accordance with some embodiments of the present disclosure.

Referring to FIG. 1 to FIG. 3, the housing 1 is opened with a connecting channel, an outlet of the inflatable interface 104 is arranged in the connecting channel, the connecting channel is provided with a protective plate 105 inside, the protective plate 105 is fixedly provided with a rotation shaft, the rotation shaft is rotationally connected to the connecting channel, and the rotation shaft is sleeved with a torsional spring. Under the action of the torsional spring, this can keep the protective plate 105 always in the connecting channel. When in use, by rotational setting the protective plate 105 in the connecting channel, which can avoid dust or foreign matter from entering into the inflatable interface 104, thereby improving the effectiveness of use and safety.

Referring to FIG. 3, the inflator pump module 102 is fixedly provided with a first pipe 108, the inflatable interface 104 is connected to the first pipe 108 through a branch pipe 110. Herein the inflatable interface 104 is provided in two groups, and their inner diameters of the two groups of inflatable interface 104 are different, in a large and a small size, which facilitates inflating different tires, thereby improving the ranges of application. Moreover, the first pipe 108 is provided with a valve, the valve preferably being a solenoid valve. When in use, by connecting the inflatable interface 104 to the first pipe 108 by means of the branch pipe 110, and then the valve is fixedly provided on the first pipe 108, which is convenient for the inflator pump module 102 to supply air to the inflatable interface 104, thereby improving the ranges of application.

Figure 5:
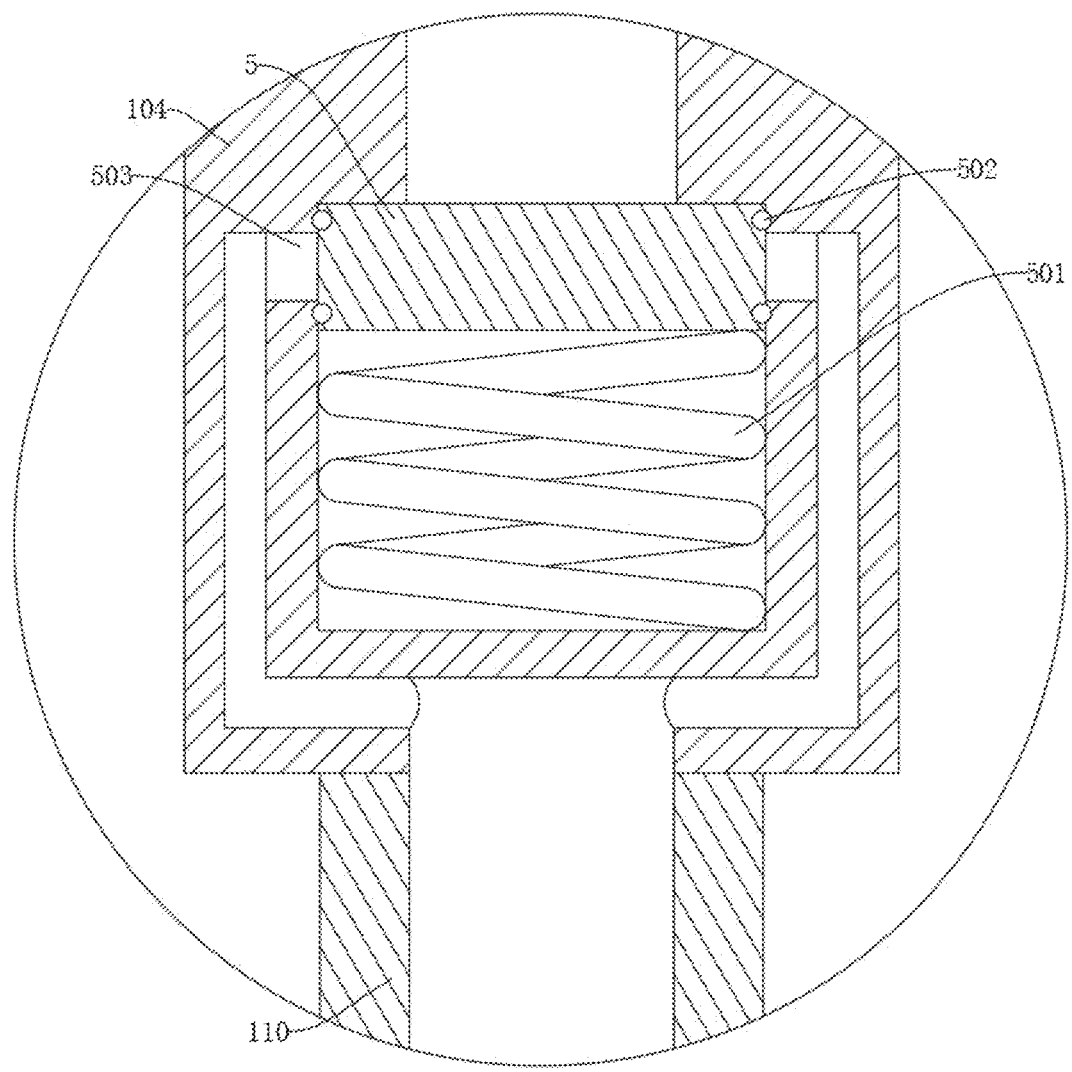
FIG. 5 shows an enlarged view at B in FIG. 3 of the inflatable equipment with a starting power supply in accordance with some embodiments of the present disclosure.

Referring to FIG. 5, the inflatable interface 104 is slidably provided with a baffle 5 inside and an inner wall of the inflatable interface 104 is opened with a vent hole 503 connected with the branch pipe 110. The baffle 5 has an outer wall against an outlet end face of the vent hole, this can block the outlet of the vent hole 503. Further, the inflatable interface 104 is provided with a spring 501 inside, and both ends of the spring 501 are against the baffle 5 and the bottom of the inflatable interface 104 respectively. When in use, by inserting the inflatable tube into the inflatable interface 104, the inflatable tube can push the baffle 5 to slide toward the bottom of the inflatable interface 104. At this time the vent hole 503 is in an open state, the air can enter into the inflatable interface 104 and then enter the tire through the inflatable tube. On the one hand, it is convenient to control the on-off of the two groups of the inflatable interfaces 104 to prevent air from being wasted. And on the other hand, it can reduce dust or other foreign matter from entering into the inflatable interface 104, thereby improving the effectiveness of use.

Referring to FIG. 5, the baffle 5 is fixedly provided with a sealing ring 502. Herein the sealing ring 502 is preferably symmetrically provided in two sets, and an outlet of the vent hole 503 is located between the two sets of sealing rings 502. When in use, by fixedly setting the sealing ring 502 on the baffle 5, which can reduce leakage of the vent hole 503, and also can improve a sealing effect between the vent hole 503 and the baffle 5.

Referring to FIG. 1 to FIG. 4, an outer wall of the air inlet 106 is fixedly provided with a dustproof net, an inner wall of the housing 1 is slidably provided with a mounting bracket 2 and the mounting bracket 2 is fixedly provided with a nozzle 201. The inflator pump module 102 is fixedly provided with a second pipe 109 with the valve, the valve on the second pipe 109 is also the solenoid valve. Further, the second pipe 109 is rotatably provided with an adapter 3, and the adapter 3 is connected with the nozzle 201 by means of an elastic pipe 301. A rotation groove is provided in the adapter 3 and the second pipe 109 is connected to the rotation groove. One end of the elastic pipe 301 is connected to the rotation groove, and the other end of the elastic pipe 301 is connected to the nozzle 201. And a sealing gasket is fixedly provided on the second pipe 109, an end surface of the sealing gasket where away from the second pipe 109 is against an inner wall of the rotation groove, thereby improving the sealing effect. When in use, by driving the mounting bracket 2 to slide on the inner wall of the housing 1, the valve on the second pipe 109 is opened and the valve on the first pipe 108 is closed, at this time the inflator pump module 102 supplies air for the nozzle 201 through the second pipe 109 and the elastic pipe 301, the nozzle 201 can blowback the dustproof net on the inner wall of the housing 1, helping to reduce dust on the dustproof net, thereby improving cleaning effect.

Figure 4:
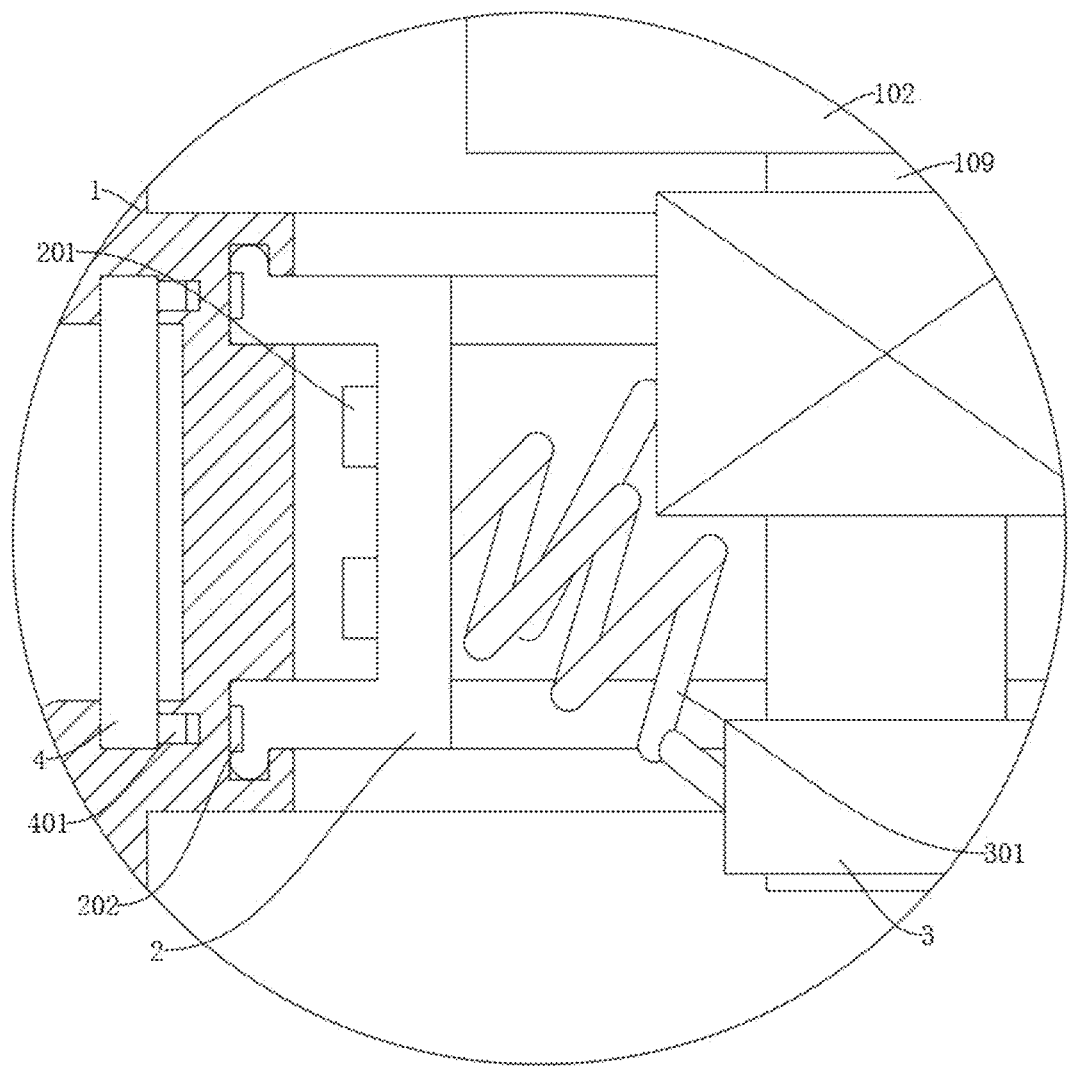
FIG. 4 shows an enlarged view at A in FIG. 3 of the inflatable equipment with a starting power supply in accordance with some embodiments of the present disclosure.

Referring to FIG. 4, an outer wall of the housing 1 is slidably provided with a drive rod 4, the mounting bracket 2 is fixedly provided with a first magnetic block 202, and the drive rod 4 is fixedly provided with a second magnetic block 401 magnetically suctioned with the first magnetic block 202. When in use, by pushing the drive rod 4 to slide along the outer wall of the housing 1, during process, the second magnetic block 401 on the drive rod 4 is absorbed with the first magnetic block 202 on the mounting bracket 2, and the mounting bracket 2 can follow the drive rod 4 to slide together, in this process, the nozzle 201 can be brought to blow the dustproof net from the inner wall of the housing 1, thereby improving the effectiveness of use.

Referring to FIG. 2, the housing 1 is opened with several sets of heat dissipation holes 107. Preferably the heat dissipation hole 107 is provided in two to four groups, more preferably two groups, located at two ends of one side of the housing 1 respectively. When in use, by opening the heat dissipation hole 107 on the housing 1, it facilitates heat dissipate in the housing 1, ensures that the battery pack 101 and the inflator pump module 102 work reliably, thereby improving the safety of use.

The foregoing description is only some better specific implementations of the present disclosure, but the scope of protection of the present disclosure is not limited thereto, any skilled person in the art familiar with the technical field within the technical scope of the present disclosure, by making equivalent substitutions or changes in accordance with the technical solution and concept of the present disclosure, shall be covered by the scope of protection of the present invention.

What is claimed is:

1. An inflatable equipment with a starting power supply, comprising
    a housing (1);
    a battery pack (101), fixedly provided in the housing (1), wherein the housing (1) is fixedly provided with a connection interface (103), and the connection interface (103) is electrically connected to the battery pack (101); and
    an inflator pump module (102), fixedly provided in the housing (1);
    wherein the inflator pump module (102) is electrically connected to the battery pack (101), the housing (1) is opened with an air inlet (106), an input end of the inflator pump module (102) is connected to the air inlet (106), the housing (1) is fixedly provided with an inflatable interface (104), and the inflatable interface (104) is connected to an output end of the inflator pump module (102).

2. The inflatable equipment with a starting power supply according to claim 1, wherein the housing (1) is opened with a connecting channel, the inflatable interface (104) is arranged in the connecting channel, the connecting channel is provided with a protective plate (105) inside, the protective plate (105) is fixedly provided with a rotation shaft, the rotation shaft is rotationally connected to the connecting channel, and the rotation shaft is sleeved with a torsional spring.

3. The inflatable equipment with a starting power supply according to claim 1, wherein the inflator pump module (102) is fixedly provided with a first pipe (108), the inflatable interface (104) is connected to the first pipe (108) through a branch pipe (110), and the first pipe (108) is provided with a valve.

4. The inflatable equipment with a starting power supply according to claim 3, wherein the inflatable interface (104) is slidably provided with a baffle (5) inside and an inner wall of the inflatable interface (104) is opened with a vent hole (503) connected with the branch pipe (110), the baffle (5) has an outer wall against an outlet end face of the vent hole, the inflatable interface (104) is provided with a spring (501) inside, and both ends of the spring (501) are against the baffle (5) and the inflatable interface (104) respectively.

5. The inflatable equipment with a starting power supply according to claim 4, wherein the baffle (5) is fixedly provided with a sealing ring (502) and the sealing ring (502) is symmetrically provided in two sets, and an outlet of the vent hole (503) is located between the two sets of sealing rings (502).

6. The inflatable equipment with a starting power supply according to claim 1, wherein an outer wall of the air inlet (106) is fixedly provided with a dustproof net, an inner wall of the housing (1) is slidably provided with a mounting bracket (2) and the mounting bracket (2) is fixedly provided with a nozzle (201), the inflator pump module (102) is fixedly provided with a second pipe (109) with the valve and the second pipe (109) is rotatably provided with an adapter (3), and the adapter (3) is connected with the nozzle (201) by means of an elastic pipe (301).

7. The inflatable equipment with a starting power supply according to claim 6, wherein an outer wall of the housing (1) is slidably provided with a drive rod (4), the mounting bracket (2) is fixedly provided with a first magnetic block (202), and the drive rod (4) is fixedly provided with a second magnetic block (401) magnetically suctioned with the first magnetic block (202).

8. The inflatable equipment with a starting power supply according to claim 1, wherein the housing (1) is opened with several sets of heat dissipation holes (107).

\* \* \* \* \*